(12) United States Patent
Shimizu et al.

(10) Patent No.: US 11,824,157 B2
(45) Date of Patent: Nov. 21, 2023

(54) ELECTRICAL STORAGE DEVICE AND METHOD FOR MAKING THE SAME

(71) Applicant: HONDA MOTOR CO., LTD., Tokyo (JP)

(72) Inventors: Wataru Shimizu, Saitama (JP); Masahiro Ohta, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 221 days.

(21) Appl. No.: 17/200,891

(22) Filed: Mar. 14, 2021

(65) Prior Publication Data

US 2021/0296688 A1 Sep. 23, 2021

(30) Foreign Application Priority Data

Mar. 17, 2020 (JP) .................................. 2020-045909

(51) Int. Cl.
*H01M 10/0562* (2010.01)
*H01M 10/0585* (2010.01)
*H01M 50/186* (2021.01)

(52) U.S. Cl.
CPC ... *H01M 10/0562* (2013.01); *H01M 10/0585* (2013.01); *H01M 50/186* (2021.01)

(58) Field of Classification Search
CPC .......... H01M 50/185; H01M 10/0562; H01M 50/10; H01M 4/34
See application file for complete search history.

(56) References Cited

U.S. PATENT DOCUMENTS

| 2011/0206980 A1* | 8/2011 | Yerramalli ............ H01M 10/39 429/163 |
| 2016/0226049 A1* | 8/2016 | Hashimoto ........... H01M 12/08 |

(Continued)

FOREIGN PATENT DOCUMENTS

| JP | S47033214 A | 11/1972 |
| JP | 2011146156 A | 7/2011 |

(Continued)

OTHER PUBLICATIONS

"A new type rechargeable lithium battery based on a Cu-cathode", Wang et al., Electrochemistry Communications 11, 1834-1837, Aug. 6, 2009.*

(Continued)

*Primary Examiner* — Kenneth J Douyette
(74) *Attorney, Agent, or Firm* — CKC & Partners Co., LLC

(57) ABSTRACT

To provide an electrical storage device in which a positive electrode material and a negative electrode material are each impregnated with a different type of electrolytic solution and a method for making the same. An electrical storage device (1) includes a negative electrode (2) including an organic electrolytic solution (21), a positive electrode (3) including an aqueous electrolytic solution (31), and a solid electrolyte (4) disposed between the negative electrode (2) and the positive electrode (3). The negative electrode (2) is entirely sealed. The electrical storage device (1) includes a sealing member (5), which is provided at the periphery of the negative electrode (2) and seals the negative electrode (2). The solid electrolytes (4) form a pair including a sealing material and together with the sealing member (5) seal the negative electrode (2) so that the negative electrode (2) is disposed between the solid electrolytes (4).

6 Claims, 5 Drawing Sheets

(56) References Cited

U.S. PATENT DOCUMENTS

| | | | |
|---|---|---|---|
| 2017/0077476 A1* | 3/2017 | Kitoh | ................... H01M 10/28 |
| 2017/0077555 A1 | 3/2017 | Hayashi et al. | |
| 2018/0287216 A1* | 10/2018 | Ohkawa | ................ H01M 10/39 |
| 2019/0334205 A1 | 10/2019 | Waseda | |

FOREIGN PATENT DOCUMENTS

| | | |
|---|---|---|
| JP | 2013161652 A | 8/2013 |
| JP | 2017010805 A | 1/2017 |
| JP | 2019192610 A | 10/2019 |
| WO | 2016006349 A1 | 1/2016 |

OTHER PUBLICATIONS

Notification of Reasons for Refusal issued in the JP Patent Application No. 2020-045909, dated Jul. 25, 2023.

* cited by examiner

ELECTRICAL STORAGE DEVICE AND METHOD FOR MAKING THE SAME

This application is based on and claims the benefit of priority from Japanese Patent Application No. 2020-045909, filed on 17 Mar. 2020, the content of which is incorporated herein by reference.

BACKGROUND OF THE INVENTION

Field of the Invention

The present invention relates to an electrical storage device and a method for making the same.

Related Art

A solid-state battery (electrical storage device) in which a positive electrode, a negative electrode, and a solid electrolyte are laminated has been conventionally known (for example, see Patent Document 1). Generally, in a solid-state battery, a positive electrode material and a negative electrode material are each compounded with a solid electrolyte. On the other hand, in some solid-state batteries, it has been reported that a positive electrode material and a negative electrode material are each impregnated with an electrolytic solution in which an electrolyte is dissolved in a solvent. It is known that when an electrolytic solution having fluidity is compounded with an electrode material, an interface between an active material and an electrolyte is well formed, thereby improving durability of a solid-state battery. Although the electrolytic solutions impregnated in the positive electrode material and the negative electrode material are of the same type, it is known that, at the laboratory level, the characteristics of the solid-state battery are improved by using an electrolytic solution that is compatible with the positive electrode material and another type of electrolytic solution that is compatible with the negative electrode material.

Patent Document 1: Japanese Unexamined Patent Application, Publication No. 2019-192610

SUMMARY OF THE INVENTION

However, there has not been proposed a specific structure using an electrolytic solution that is compatible with a positive electrode material and another type of electrolytic solution that is compatible with a negative electrode material.

In response to the above issue, it is an object of the present invention to provide an electrical storage device in which a positive electrode material and a negative electrode material are each impregnated with a different type of electrolytic solution and a method for making the same.

An electrical storage device (e.g., the electrical storage device 1 described later) according to a first aspect includes a first electrode (e.g., the negative electrode 2 described later) including a first electrolytic solution (e.g., the organic electrolytic solution 21 described later), a second electrode (e.g., the positive electrode 3 described later) including a second electrolytic solution (e.g., the aqueous electrolytic solution 31 described later) different from the first electrolytic solution, and a solid electrolyte (e.g., the solid electrolyte 4 described later) disposed between the first electrode and the second electrode. The first electrode is entirely sealed.

According to the first aspect, the first electrode and the second electrode are soundly isolated from each other by sealing the first electrode entirely, thus avoiding the mixing of the electrolytic solutions of the two electrodes. Therefore, a different type of electrolytic solution can be used for each of the first electrode and the second electrode. Consequently, according to the first aspect, it is possible to provide an electrical storage device in which each of a positive electrode material and a negative electrode material is impregnated with a different type of electrolytic solution.

In a second aspect according to the first aspect, the electrical storage device may further include a sealing member (e.g., the sealing member 5 described later) at a periphery of the first electrode, and the sealing member may seal the first electrode. The solid electrolytes may form a pair including a sealing material and together with the sealing member seal the first electrode so that the first electrode is disposed between the solid electrolytes.

According to the second aspect, since the sealing member that seals the first electrode is placed, and the solid electrolytes form a pair including a sealing material and together with the sealing member seal the first electrode so that the first electrode is disposed between the solid electrolytes, the first electrode and the second electrode can be separated from each other more soundly. Thus, the effect of the first aspect is achieved more surely. Further, since the solid electrolytes also serve as members for sealing the first electrode, the size and weight of the electrical storage device can be reduced.

In a third aspect according to the first or the second aspect, the first electrode and the second electrode each may have an internal pressure less than atmospheric pressure.

According to the third aspect, by making the first electrode and the second electrode have an internal pressure less than atmospheric pressure, when injecting the second electrolytic solution into the second electrode under reduced pressure at the time of making, it is possible to prevent damage to the first electrode from occurring due to a pressure difference between the first electrode and the second electrode.

In a fourth aspect according to any one of the first aspect to the third aspect, the first electrode may be a negative electrode impregnated with a non-aqueous electrolytic solution as the first electrolytic solution, and the second electrode may be a positive electrode impregnated with an aqueous electrolytic solution as the second electrolytic solution.

According to the fourth aspect, the first electrode is a negative electrode impregnated with a non-aqueous electrolytic solution as the first electrolytic solution, and the second electrode is a positive electrode impregnated with an aqueous electrolytic solution as the second electrolytic solution, and thereby it is possible to provide an electrical storage device in which the positive electrode material is impregnated with an aqueous electrolytic solution, and the negative electrode material is impregnated with a non-aqueous electrolytic solution.

In a fifth aspect according to any one of the first aspect to the third aspect, the first electrode may be a negative electrode, and the second electrode may be a positive electrode and have an internal pressure less than that of the first electrode in an initial state.

According to the fifth aspect, although gas is generated in the positive electrode during use, by setting the internal pressure of the positive electrode to a small value in advance, it is possible to prevent damage from occurring due to an increase in internal pressure.

A method for making an electrical storage device (e.g., the electrical storage device 1 described later) according to a sixth aspect includes placing a first material (e.g., the active material 200, the electroconductive material 201, the binder (not shown), the separator 202 described later) to be a first electrode (the negative electrode 2 described later) under a reduced pressure that is less than atmospheric pressure (e.g., Step S10 described later), impregnating the first material placed under the reduced pressure with a first electrolytic solution (e.g., the organic electrolytic solution 21 described later) to form the first electrode (e.g., Step S20 described later), sealing the first electrode entirely under the reduced pressure (e.g., Step S30 described later), laminating a second material (e.g., the active material 300, the electroconductive material 301, the binder (not shown) described later) to be a second electrode (e.g., the positive electrode 3 described later) on the first electrode (e.g., Step S40 described later), housing the first electrode and the second material in an exterior material (e.g., the exterior material 6 described later) (e.g., Step S50 described later), placing an interior of the exterior material in a state of the reduced pressure (e.g., Step S60 described later), impregnating the second material placed under the reduced pressure with a second electrolytic solution (e.g., the aqueous electrolytic solution 31 described later) different from the first electrolytic solution to form the second electrode (e.g., Step S70 described later), and sealing the exterior material under the reduced pressure (e.g., Step S80 described later).

According to the sixth aspect, the electrical storage devices according to the first aspect to the fifth aspect can be surely obtained, and the effects of the invention according to the first aspect to the fifth aspect can be obtained. In addition, since the second electrode is impregnated with the second electrolytic solution under reduced pressure, damage to the first electrode can be prevented from occurring due to a pressure difference between the first electrode and the second electrode.

According to the present invention, it is possible to provide an electrical storage device in which a positive electrode material and a negative electrode material are each impregnated with a different type of electrolytic solution and the method for making the same.

DETAILED DESCRIPTION OF THE INVENTION

Embodiments of the present invention will be described in detail with reference to the drawings.

First Embodiment

Figure 1:
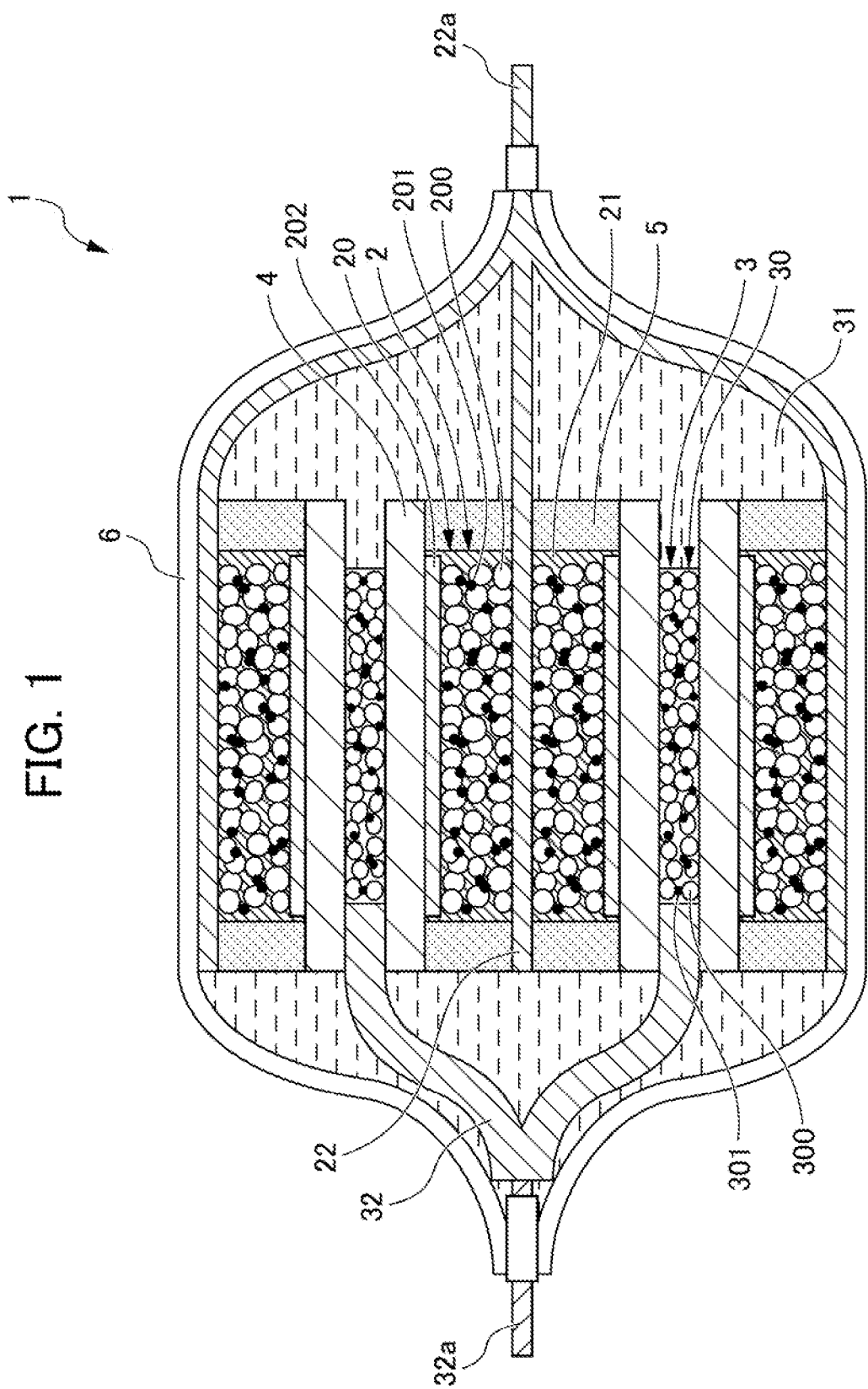
FIG. 1 is a schematic cross-sectional view of an electrical storage device according to a first embodiment of the present invention.
Figure 2:
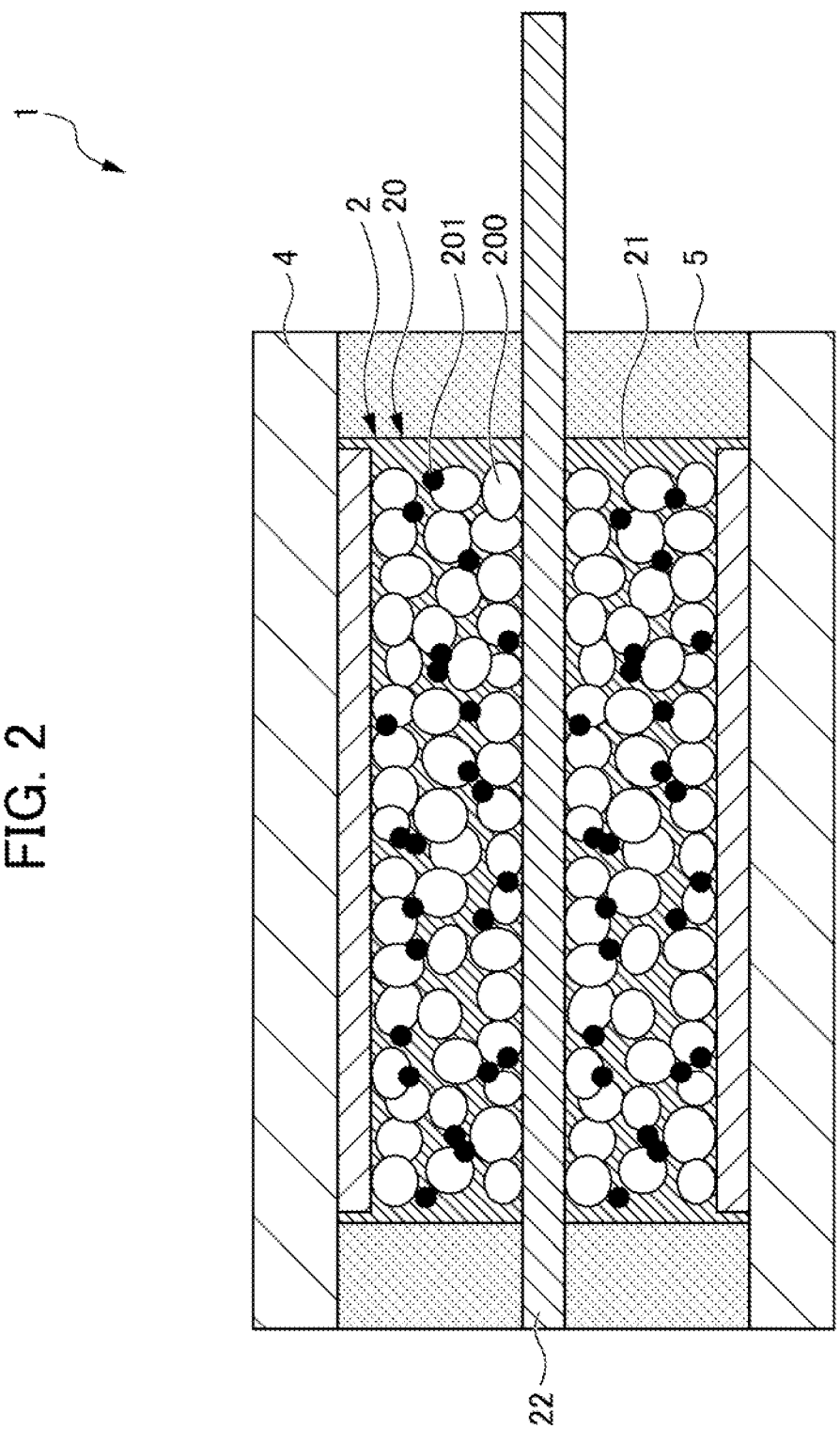
FIG. 2 is a schematic cross-sectional view of a negative electrode and the surrounding area of the negative electrode, included in the electrical storage device illustrated in FIG. 1.

First, the structure of an electrical storage device 1 according to a first embodiment will be described with reference to FIGS. 1 and 2. FIG. 1 is a schematic cross-sectional view of the electrical storage device 1. FIG. 2 is a schematic cross-sectional view of a negative electrode 2 and the surrounding area of the negative electrode, included in the electrical storage device 1.

As shown in FIGS. 1 and 2, the electrical storage device 1 includes the negative electrode 2, a positive electrode 3, a solid electrolyte 4, a sealing member 5, an exterior material 6, and other components.

The negative electrode 2 is obtained by impregnating a negative electrode material mixture 20 with an organic electrolytic solution 21 as a first electrolytic solution. The negative electrode 2 is entirely sealed by the solid electrolyte 4 and the sealing member 5, and is housed in the exterior material 6. The negative electrode 2 includes a current collector 22 that connects from the negative electrode material mixture 20 impregnated with the organic electrolytic solution 21 to the outside of the exterior material 6. The negative electrode 2 has an internal pressure less than atmospheric pressure. In the negative electrode material mixture 20, an active material 200 and an electroconductive material 201 are bonded together by a binder. A separator 202 is disposed between the solid electrolyte 4 and the negative electrode material mixture 20. The current collector 22 constitutes a negative electrode terminal 22a outside the exterior material 6. Note that the separator 202 may not be provided.

For the active material 200, a material capable of occluding and releasing lithium ions with a large specific capacity at a low standard electrode potential is applicable. For example, hard carbon is employed. As the electroconductive material 201, for example, carbon black is employed. As the binder, for example, PVDF (polyvinylidene fluoride) is employed. As the organic electrolytic solution 21, for example, $LiPF_6$ (lithium hexafluoride phosphate) is employed. As the separator 202, for example, a polypropylene resin, a polyethylene terephthalate resin, cellulose, or the like is employed. As the current collector 22, for example, copper is employed. Note that the above-described organic electrolytic solution 21 may be in the form of a gel that is absorbed in a polymer matrix such as methacrylic acid resin or polyethylene oxide, or in the form of a high-viscosity sol compounded with a thickener or other agent.

The positive electrode 3 is obtained by impregnating a positive electrode material mixture 30 with an aqueous electrolytic solution 31 as a second electrolytic solution different from the first electrolytic solution, and is housed in the exterior material 6. The positive electrode 3 includes a current collector. 32 that connects from the positive electrode material mixture 30 impregnated with the aqueous electrolytic solution 31 to the outside of the exterior material 6. The positive electrode 3 has an internal pressure less than atmospheric pressure, and the internal pressure is equal to or less than the internal pressure of the negative electrode 2 in the initial state, and the amount of electricity per unit area of the positive electrode 3 is less than that of the negative electrode 2. The amount of electricity per unit area of the positive electrode 3 is preferably 0.1 times or more and 0.95 times or less, more preferably 0.9 times, the amount of electricity per unit area of the negative electrode 2. The positive electrode 3 viewed from the laminating direction is preferably disposed inside the negative electrode 2. Taking into account misalignment in the laminating step, the length of the protrusion of the negative electrode 2 from the projection surface of the positive electrode 3 is preferably 0.1 mm or more and 5 mm or less, more preferably 1 mm. In the positive electrode material mixture 30, an active material 300 and an electroconductive material 301 are bonded together by a binder (not shown). The current collector 32 constitutes a positive electrode terminal 32$a$ outside the exterior material 6. In addition, a separator may be disposed as an interference material between the solid electrolyte 4 and the positive electrode material mixture 30.

For the active material 300, a material capable of reversibly occluding and releasing lithium ions with a large specific capacity at a high standard electrode potential is applicable. For example, Li(Ni—Mn—Co)O$_2$ (ternary lithium) is employed. As the electroconductive material 301, for example, carbon black is employed. As the binder, for example, PVDF (polyvinylidene fluoride) is employed. As the aqueous electrolytic solution 31, for example, Li$_2$SO$_4$ (lithium sulfate) or CH$_3$COOLi (lithium acetate) is employed. As the current collector 32, for example, aluminum is employed. Note that the above-described aqueous electrolytic solution 31 may be in the form of a gel that is absorbed in a polymer matrix such as methacrylic acid resin or polyethylene oxide, or in the form of a high-viscosity sol compounded with a thickener or other agent.

The solid electrolyte 4 is disposed between the negative electrode 2 and the positive electrode 3. In particular, as shown in FIG. 2, the solid electrolytes 4 are a pair including a sealing material (not shown), and together with the sealing member seals the negative electrode 2 so that the negative electrode 2 is disposed between the solid electrolytes.

For the solid electrolyte 4, a solid electrolyte that conducts lithium ions is applicable. For example, a plate-like Li$_{1+x+y}$Al$_x$Ti$_{2-x}$Si$_y$P$_{3-y}$O$_{12}$ (x=0.3, y=0.2) (LTAP) or a powdered LTAP, in which polypropylene is mixed as a sealing material, is employed. For example, the mixing ratio of LTAP and polypropylene in the solid electrolyte 4 (amount of polypropylene/amount of LTAP) is preferably 0.05 or more and 0.2 or less, more preferably 0.1, by weight.

The sealing member 5 is provided at the periphery of the negative electrode 2, and seals the negative electrode 2 by tightly bonding the solid electrolyte 4 and the periphery of the negative electrode 2. For the sealing member 5, a material having excellent chemical stability with respect to an electrolytic solution and excellent sealing property is applicable. For example, polypropylene is employed. The method for bonding the solid electrolyte 4 and the periphery of the negative electrode 2 may be any method as long as it provides excellent adhesiveness and sealing property. For example, when polypropylene is employed as the sealing member 5, they are bonded by heat welding.

The exterior material 6 houses the negative electrode 2 and the positive electrode 3. As the exterior material 6, for example, an aluminum laminate material or an aluminum can is employed.

Figure 3:
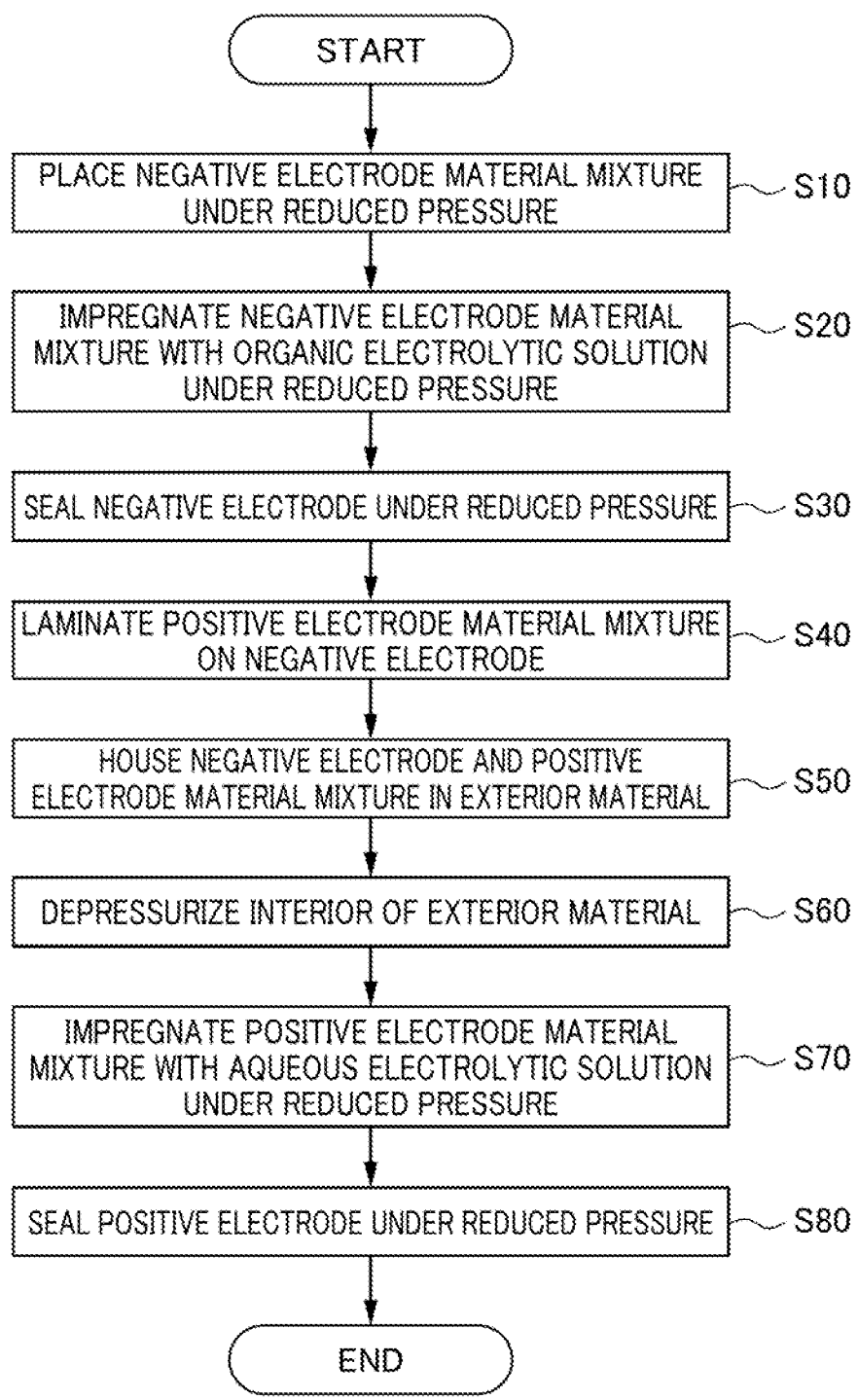
FIG. 3 is a flowchart illustrating a method for making the electrical storage device illustrated in FIG. 1.

Next, a method for making the electrical storage device 1 will be described with reference to FIG. 3. FIG. 3 is a flowchart illustrating the method for making the electrical storage device 1.

As shown in FIG. 3, the method for making the electrical storage device 1 includes a plurality of steps S10 to S80.

In Step S10, the negative electrode material mixture 20 to be the negative electrode 2 is placed under a reduced pressure that is less than atmospheric pressure. For example, the negative electrode material mixture 20 is placed under a reduced pressure of about 0.1 MPa less than atmospheric pressure.

In Step S20, while maintaining the state of reduced pressure in Step 310, the negative electrode material mixture 20 placed under the reduced pressure is impregnated with the organic electrolytic solution 21 to form the negative electrode 2.

In Step S30, while maintaining the state of reduced pressure in Step S20, the negative electrode 2 is entirely sealed with the solid electrolyte 4 and the sealing member 5 under the reduced pressure.

In Step S40, the positive electrode material mixture 30 to be the positive electrode 3 is laminated on the negative electrode 2 sealed with the solid electrolyte 4 and the sealing member 5.

In Step S50, the negative electrode 2 and the positive electrode material mixture 30 are housed in the exterior material 6.

In Step S60, the interior of the exterior material 6 is depressurized to a state less than atmospheric pressure. For example, the interior of the exterior material 6 is depressurized to about 0.1 MPa less than atmospheric pressure. Note that the internal pressure of the exterior material 6 (i.e., the internal pressure of the positive electrode 3) may be less than that of the negative electrode 2.

In Step S70, while maintaining the state of reduced pressure in Step S60, the positive electrode material mixture 30 placed under the reduced pressure is impregnated with the aqueous electrolytic solution 31 to form the positive electrode 3.

In Step S80, while maintaining the state of reduced pressure in Step S70, the exterior material 6 is sealed under the reduced pressure.

The electrical storage device 1 according to the present embodiment achieves the following effects. First, according to the present embodiment, since the negative electrode 2 is entirely sealed, a different type of electrolytic solution can be used for each of the negative electrode 2 and the positive electrode 3.

Further, according to the present embodiment, since the solid electrolyte 4 also serves as a member for sealing the negative electrode 2, the size and weight can be reduced.

In addition, according to the present embodiment, since the positive electrode 3 is impregnated with the aqueous electrolyte solution 31 under reduced pressure at the time of making, damage to the negative electrode 2 can be prevented from occurring due to a pressure difference between the negative electrode 2 and the positive electrode 3.

Further, according to the present embodiment, transfer of the positive ions is facilitated, and the characteristics of the battery (electrical storage device 1) are improved.

Further, according to the present embodiment, although gas is generated in the positive electrode 3 during use, by setting the internal pressure of the positive electrode 3 to a small value in advance, damage due to an increase in internal pressure can be prevented.

Further, the method for making the electrical storage device 1 according to the present embodiment achieves the following effect. That is, according to the present embodiment, since the positive electrode 3 is impregnated with the aqueous electrolyte solution 31 under reduced pressure, damage to the negative electrode 2 can be prevented from occurring due to a pressure difference between the negative electrode 2 and the positive electrode 3.

Second Embodiment

Figure 4A:
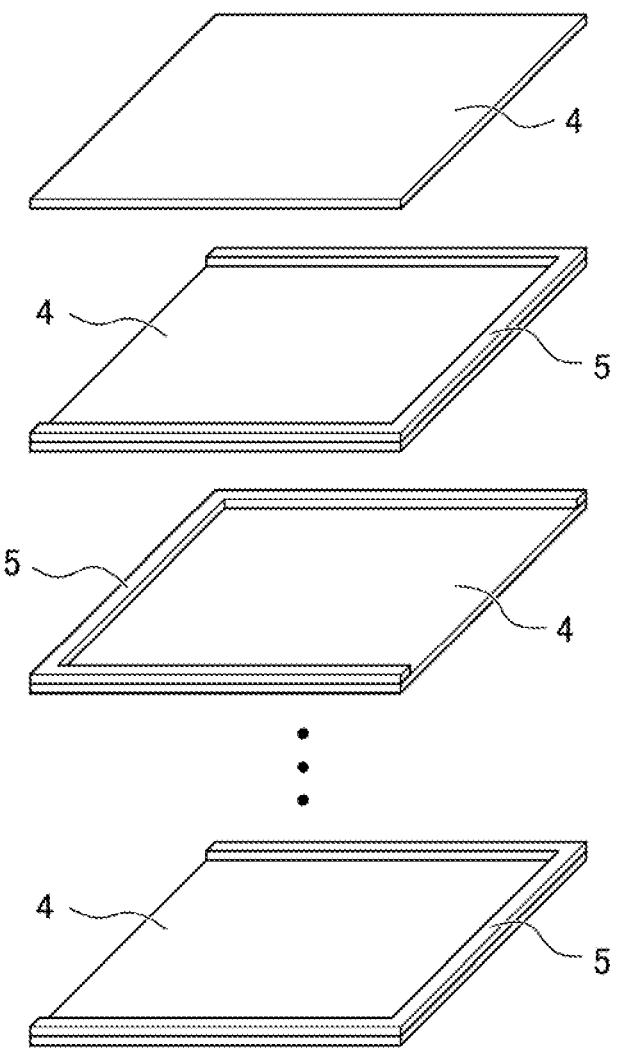
FIG. 4A is a process diagram illustrating a method for making an electrical storage device according to a second embodiment of the present invention, and illustrates a state before superimposing a plurality of solid electrolytes.
Figure 4B:
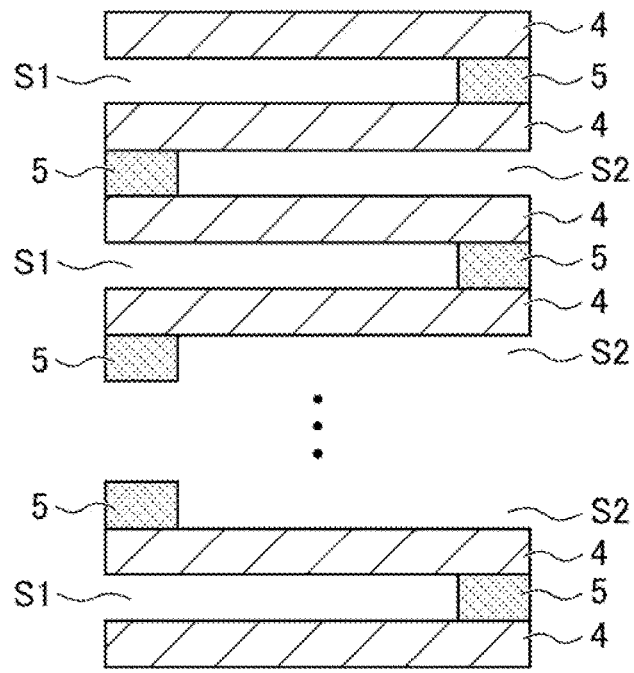
FIG. 4B is a process diagram illustrating the method for making the electrical storage device according to the second embodiment of the present invention, and illustrates a state after superimposing the plurality of solid electrolytes.
Figure 4C:
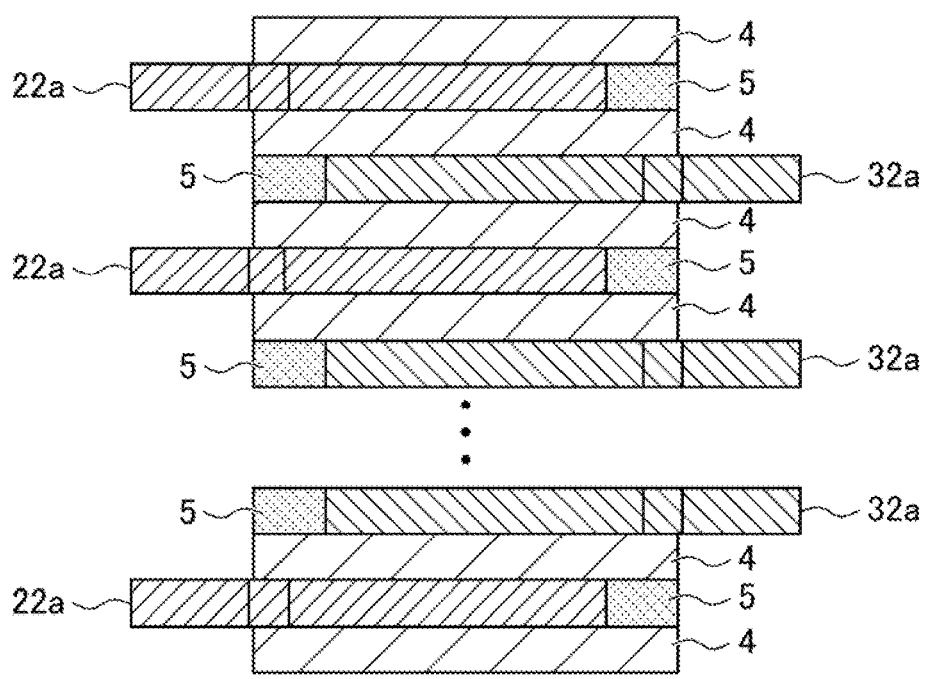
FIG. 4C is a process diagram illustrating the method for making the electrical storage device according to the second embodiment of the present invention, and illustrates a state after placing negative electrode terminals and positive electrode terminals.

Next, a method for making an electrical storage device 41 according to a second embodiment will be described with reference to FIGS. 4A to 4C. FIGS. 4A to 4C are process diagrams illustrating the method for making the electrical storage device 41. FIG. 4A illustrates a state before superimposing a plurality of solid-state electrolytes 4. FIG. 4B illustrates a state after superimposing the plurality of solid-state electrolytes 4. FIG. 4C illustrates a state after placing negative electrode terminals and positive electrode terminals.

As shown in FIG. 4A, when the plurality of solid electrolytes 4 are superimposed, each sealing member 5 is disposed in a U-shape between each adjacent solid electrolyte 4. The open side of each of the U-shaped spaces defined by the sealing members 5 respectively alternates from left to right.

As shown in FIG. 4B, the plurality of solid electrolytes 4 are superimposed so that each sealing member 5 is disposed between each adjacent solid electrolyte 4. As a result, spaces S1 and S2 are formed so that the open sides alternate from left to right.

As shown in FIG. 4C, negative terminals 22a are disposed on one side of the left and right sides, and positive terminals 32a are disposed on the other side of the left and right sides, so that the negative and positive terminals respectively protrude from spaces S1 and S2 through the open sides. Thereafter, an organic electrolytic solution (not shown) is injected into space S1 on the side where the negative electrode terminal 22a is disposed, and space S1 is sealed while maintaining a reduced pressure of about 0.1 MPa less than atmospheric pressure. Thereafter, an aqueous electrolytic solution (not shown) is injected into space S2 on the side where the positive electrode terminal 32a is disposed, and space S2 is sealed while maintaining a reduced pressure of about 0.1 MPa less than atmospheric pressure.

Note that the present invention is not limited to the above embodiments, and variations, improvements, and the like within the scope that can achieve the object of the present invention are included in the present invention.

In the above embodiments, a surface treatment may be applied to the bonding surface of the solid electrolyte 4 with the sealing member 5 and the bonding surface of the current collector 22 with the sealing member 5. The surface treatment may be structural or chemical. As the structural surface treatment, for example, roughening by etching process can be employed. The surface roughness is, for example, 0.3 µm<Ra<12 µm. As the chemical surface treatment, for example, formation of surface functional groups by primer coating or surface modification by plasma treatment can be employed.

What is claimed is:

1. An electrical storage device comprising:
    a first electrode comprising a first electrolytic solution;
    a second electrode comprising a second electrolytic solution different from the first electrolytic solution;
    solid electrolytes disposed between the first electrode and the second electrode; and
    a sealing member at a periphery of the first electrode, the sealing member sealing the first electrode,
    wherein the solid electrolytes form a pair comprising a sealing material and together with the sealing member entirely seal the first electrode so that the first electrode is disposed between the solid electrolytes.

2. The electrical storage device according to claim 1, wherein the first electrode and the second electrode each have an internal pressure less than atmospheric pressure.

3. The electrical storage device according to claim 1, wherein the first electrode is a negative electrode impregnated with a non-aqueous electrolytic solution as the first electrolytic solution, and
    wherein the second electrode is a positive electrode impregnated with an aqueous electrolytic solution as the second electrolytic solution.

4. The electrical storage device according to claim 2, wherein the first electrode is a negative electrode impregnated with a non-aqueous electrolytic solution as the first electrolytic solution, and
    wherein the second electrode is a positive electrode impregnated with an aqueous electrolytic solution as the second electrolytic solution.

5. The electrical storage device according to claim 1, wherein the first electrode is a negative electrode, and
    wherein the second electrode is a positive electrode and has an internal pressure less than that of the first electrode in an initial state.

6. The electrical storage device according to claim 2, wherein the first electrode is a negative electrode, and
    wherein the second electrode is a positive electrode and has an internal pressure less than that of the first electrode in an initial state.

* * * * *